(12) United States Patent
Hilger et al.

(10) Patent No.: US 12,140,789 B2
(45) Date of Patent: Nov. 12, 2024

(54) DISPLAY UNIT WITH CHANGING SYMBOLS

(71) Applicant: Bayerische Motoren Werke Aktiengesellschaft, Munich (DE)

(72) Inventors: Thomas Hilger, Iffeldorf (DE); Stephan Mueller, Munich (DE); Elisabeth Schmidt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/277,114

(22) PCT Filed: May 4, 2022

(86) PCT No.: PCT/EP2022/061889
§ 371 (c)(1),
(2) Date: Aug. 14, 2023

(87) PCT Pub. No.: WO2022/238185
PCT Pub. Date: Nov. 17, 2022

(65) Prior Publication Data
US 2024/0125998 A1    Apr. 18, 2024

(30) Foreign Application Priority Data
May 12, 2021    (DE) .................. 10 2021 112 501.4

(51) Int. Cl.
*F21V 8/00*    (2006.01)
*B60K 35/21*    (2024.01)
*B60Q 3/14*    (2017.01)

(52) U.S. Cl.
CPC ............ *G02B 6/0023* (2013.01); *B60Q 3/14* (2017.02); *G02B 6/0028* (2013.01); *G02B 6/003* (2013.01);
(Continued)

(58) Field of Classification Search
CPC .... G02B 6/0023; G02B 6/0028; G02B 6/003; G02B 6/0068; G02B 6/0076; B60Q 3/14; B60K 35/212; B60K 2360/34
See application file for complete search history.

(56) References Cited

U.S. PATENT DOCUMENTS

| 5,142,415 A | 8/1992 | Koehnle |
| 2013/0027953 A1* | 1/2013 | Krier ............... B60K 35/00 362/509 |

(Continued)

FOREIGN PATENT DOCUMENTS

| DE | 20 2016 001 845 U1 | 8/2016 |
| DE | 10 2018 221 841 A1 | 6/2020 |

(Continued)

OTHER PUBLICATIONS

International Search Report (PCT/ISA/210) issued in PCT Application No. PCT/EP2022/061889 dated Aug. 16, 2022 with English translation (5 pages).

(Continued)

*Primary Examiner* — Mary Ellen Bowman
(74) *Attorney, Agent, or Firm* — Crowell & Moring LLP

(57) ABSTRACT

A display unit includes a layer with a plurality of sub-regions which are arranged adjacently to one another along an illuminated edge of the layer. A corresponding number of symbols are arranged in the sub-regions. The display unit additionally has a plurality of light sources. The said light sources are arranged adjacently to one another along the illuminated edge of the layer. Each light source is configured to emit light into the respective sub-region of the layer via the illuminated edge of the layer. The display unit additionally has a limiting element which is arranged between the illuminated edge of the layer and the light sources and which is configured to limit the light emitted from the light sources (Continued)

for each sub-region such that the symbol in the respective sub-region is illuminated in a selective manner by the light sources.

15 Claims, 3 Drawing Sheets

(52) U.S. Cl.
CPC ......... *G02B 6/0068* (2013.01); *G02B 6/0076* (2013.01); *B60K 35/212* (2024.01); *B60K 2360/34* (2024.01)

(56) References Cited

U.S. PATENT DOCUMENTS

| | | |
|---|---|---|
| 2016/0274761 A1 | 9/2016 | Alonso Ruiz et al. |
| 2018/0056788 A1 | 3/2018 | Boron et al. |

FOREIGN PATENT DOCUMENTS

| | | |
|---|---|---|
| EP | 2 372 914 A1 | 10/2011 |
| WO | WO 2015/091359 A1 | 6/2015 |

OTHER PUBLICATIONS

German-language Written Opinion (PCT/ISA/237) issued in PCT Application No. PCT/EP2022/061889 dated Aug. 16, 2022 with English translation (9 pages).
German-language Search Report issued in German Application No. 10 2021 112 501.4 dated Oct. 21, 2021 with partial English translation (12 pages).

\* cited by examiner

DISPLAY UNIT WITH CHANGING SYMBOLS

BACKGROUND AND SUMMARY OF THE INVENTION

The invention relates to a display unit for an operating element having different symbols, which can be selectively illuminated and displayed.

A vehicle can include an operating element (such as a button), which can be used to control different functions. The function which can be triggered by actuating the operating element can depend on the respective context of the actuation. The function which can be triggered in a specific context by actuating the operating element can be displayed by an illuminated symbol on the operating surface of the operating element.

The operating element can include a display unit below the transparent operating surface, which is designed to display a plurality of different symbols for the corresponding plurality of different functions of the operating element in a selective manner. The different symbols can each be arranged as a microstructure in different layers of the display unit. The different layers can be illuminated selectively from the lateral edge of the respective layer, in order to make the symbol of the respective layer visible on the operating surface of the operating element.

The use of different layers has the result that the different symbols can appear at different depths for an observer. Furthermore, the light intensity with which the different symbols are perceived in the different layers at the operating surface can vary. This can negatively affect the visibility of the different symbols and can be perceived as low value by an observer.

The present document relates to the technical object of providing a display unit having a changing symbol for an operating element having a transparent operating surface, which enables a uniform display of different symbols.

The object is achieved by the claimed invention. It is to be noted that additional features of a claim dependent on an independent claim, without the features of the independent claim or in combination with only a subset of the features of the independent claim, can form a separate invention independent of the combination of all features of the independent claim, which can be made the subject matter of an independent claim, a divisional application, or a subsequent application. This applies in the same manner to technical teachings described in the description, which can form an invention independent of the features of the independent claims.

According to one aspect, a display unit for an operating element is described. The operating element can include a (transparent) operating surface, which can be actuated by a user of the operating element to trigger a function. The operating element can be designed here to change the function which can be formed by actuating the operating surface (for example to change it depending on context). It can therefore be made possible to trigger in each case precisely one function from a plurality of different functions (depending on the context) by actuating the same operating surface. The function which is triggered by the actuation of the operating surface can be dependent here on the current context.

The display unit described in this document can be designed to display in a selective manner (precisely) one symbol in each case from a plurality of different symbols for the corresponding plurality of different functions. In particular, precisely the symbol for precisely the function can always be displayed here which can be triggered at the respective point in time using the operating element. The other symbols (for the other functions which cannot be triggered at the respective point in time using the operating element) are then not displayed.

The display unit comprises at least one (or precisely one), typically transparent layer having a plurality of subregions, wherein the subregions are arranged adjacent to one another along an illuminated edge of the layer. The layer can include, for example, 2 or more or 3 or more or 4 or more subregions (each having one symbol). The layer can have a layer thickness of 2 mm or less. Furthermore, the layer can include an area having edge lengths of 1 cm or more. In particular, the illuminated edge of the layer can have an edge length of 1 cm or more.

The individual subregions can extend away from the illuminated edge over the area of the layer. A corresponding plurality of symbols can be displayed in the plurality of subregions. The plurality of symbols for the corresponding plurality of functions which are to be triggerable in a selective (i.e., mutually exclusive) manner using the operating element, can therefore be arranged adjacent to one another in a corresponding plurality of different subregions of a layer (in particular a film). The different symbols can be arranged adjacent to one another here along the illuminated edge of the layer. It can then be effectuated that the symbols have a uniformly high light intensity and/or depth at the operating surface.

The symbol in a subregion of the layer can include a microstructure, at which the light is reflected and/or scattered in the subregion such that the symbol becomes visible on the surface of the layer, in particular on the operating surface of the operating element.

The display unit comprises a plurality of light sources (for example light-emitting diodes, LEDs) for the corresponding plurality of subregions, wherein the different (punctiform) light sources are arranged adjacent to one another along the illuminated edge of the layer. The individual light sources are each designed to emit light into the respective subregion of the layer via the illuminated edge of the layer. The display unit therefore respectively includes one light source for one subregion of the layer in each case along the illuminated edge of the layer. The light source for a subregion can be used to illuminate the symbol arranged in the subregion, and thus to make it visible at the operating surface.

The display unit furthermore comprises a delimitation element, which is arranged between the illuminated edge of the layer and the plurality of light sources, and which is designed to delimit the light emitted from the individual light sources for one subregion in each case such that the symbol in the respective subregion is illuminated by the individual light sources in a selective manner. The delimitation element can be designed in particular to delimit the light emitted from an arbitrary first light source from the plurality of light sources for a first subregion from the plurality of subregions such that the symbol in the first subregion is illuminated by the light source, without the symbols in any one of the one or more other subregions from the plurality of subregions being illuminated at the same time.

A display unit is therefore described which enables multiple different symbols for multiple different functions of an operating element to be arranged in a single layer and to be illuminated selectively (i.e., in a mutually exclusive manner), in particular such that only the symbol for the function is always displayed at the operating surface of the operating element which can be triggered at the respective point in time by actuating the operating element. Due to the arrangement of multiple symbols in a single layer, wherein the symbols can each be illuminated individually, a display unit efficient in installation space can be provided having a uniform display quality (in particular with respect to the light intensity and/or the depth) for different symbols.

In one preferred example, the delimitation element comprises a plurality of slats, which are arranged adjacent to one another along the illuminated edge of the layer. The plurality of slats can form a viewing protection filter. In particular, the plurality of slats can be designed to delimit the deviation of the angle in which the light from an (arbitrary) light source (from the plurality of light sources) is incident on the illuminated edge of the layer from the perpendicular standing on the illuminated edge to a predefined maximum value. The maximum value can be 30° or less.

The individual slats can each extend perpendicularly away from the illuminated edge of the layer to the plurality of light sources. Slats arranged directly adjacent to one another can have, for example, a spacing between 50 µm and 100 µm in relation to one another. Furthermore, the individual slats can have, for example, a web length along the perpendicular standing on the illuminated edge between 100 µm and 300 µm. The delimitation of the angle of the light incident on the illuminated edge of the layer can thus be delimited in a particularly effective manner.

The plurality of slats can include a subset of slats in each case for each of the plurality of subregions, which is arranged between the light source for the respective subregion and the section of the illuminated edge of the layer for the respective subregion. An arrangement of slats can thus be provided for each light source or for each subregion in order to limit the angle at which light is incident on the respective subregion.

Due to the use of a delimitation element which includes a plurality of slats, a selective (i.e., mutually exclusive) illumination of the plurality of symbols by the corresponding plurality of light sources can be effectuated in a particularly effective and reliable manner.

Alternatively or additionally, the delimitation element can comprise a plurality of light channels for the corresponding plurality of light sources. In this case, the light channel for a light source can extend in each case between the light source and the section of the illuminated edge of the layer in which the subregion of the layer illuminated by the light source is arranged. The individual light channels can be formed tubular here in order to conduct light from the respective light source to the illuminated edge of the layer.

The light channel for a light source can include an inner wall which is designed to bundle the light emitted by the light source and guide it to the illuminated edge of the layer. The inner wall can be designed here to reflect light incident on the inner wall in order to conduct the light in a particularly reliable manner to the illuminated edge of the layer.

The light channel for a light source can include an outlet facing away from the light source, which faces toward the illuminated edge of the layer. The outlet of the light channel can have a width (along the edge of the layer) which is adapted to the width of the subregion illuminated by the light source. Alternatively or additionally, the outlet of the light channel can have a height (along the layer thickness of the layer) which is adapted to the thickness of the layer. It is thus possible to cause the largest possible proportion of the light of a light source to be coupled into the respective subregion of the layer.

The light channel for a light source can have a cross-section having a cross-sectional area which increases originating from the light source to the illuminated edge of the layer. The light channel can thus widen toward the outlet of the light channel, in order to define the angle range in a particularly reliable manner, at which the light from the light channel propagates in a subregion of the layer.

Alternatively, the light channel for a light source can have a cross-section having a cross-sectional area which remains unchanging in size from the light source up to the illuminated edge of the layer. Particularly strong focusing of the light within the illuminated subregion can thus be effectuated.

The light channel for a light source can form a chamber for the light emitted by the light source. The chamber can include an opening, which faces toward the illuminated edge of the layer and is punctiform in particular, for light from the chamber. The light of a light source can thus be directed in a particularly efficient manner onto the symbol in a subregion.

The delimitation element can therefore include light channels for the individual light sources in order to enable particularly reliable and efficient selective illumination of the individual symbols on the layer of the display unit.

Alternatively or additionally, the delimitation element can include a plurality of optical (converging) lenses for the corresponding plurality of light sources. The individual lenses can be convex or biconvex. The optical lens for a light source can be designed to bundle the light emitted by the light source (in a selective manner) onto the subregion of the layer which is illuminated by the light source. Efficient selective illumination of individual symbols of the layer can thus be effectuated.

The display unit can possibly include multiple layers, wherein each individual layer respectively includes a plurality of subregions having a corresponding plurality of symbols. Furthermore, the display unit can respectively include a plurality of light sources for each layer. The individual layers can be stacked one on top of another. The number of different symbols which can be displayed in a selective manner by the display unit can thus be further increased.

According to a further aspect, an operating element is described which comprises a transparent operating surface that is designed to be actuated by a user to trigger a function. Furthermore, the operating element comprises the display unit described in this document, wherein the one or more layers of the display unit (having the different symbols) are covered by the transparent operating surface.

As already described above, the operating element can be designed, in reaction to an actuation of the operating surface, to trigger one function from a plurality of different functions in each case in a context-dependent, selective (i.e., mutually exclusive) manner. In other words, it can be made possible for a user to trigger in each case one from a plurality of different functions depending on context by actuating a single operating element. The plurality of different functions can be associated here with the corresponding plurality of different symbols on a layer of the display unit.

The operating element can comprise a control unit, which is designed to ascertain the first function from the plurality of functions, which is to be triggerable via the operating element. Furthermore, the control unit can be configured to ascertain the first light source, by which the symbol associated with the first function is illuminated. The first light source can then be caused (in a selective manner) to emit light in order (in a selective manner) to illuminate the symbol associated with the first function.

According to a further aspect, a (road) motor vehicle (in particular a passenger vehicle or a truck or a bus or a motorcycle) is described which comprises the operating element described in this document.

It is to be noted that the devices and systems described in this document can be used both alone and in combination with other devices and systems described in this document. Furthermore, any aspects of the devices and systems described in this document can be combined with one another in diverse ways. In particular, the features of the claims can be combined with one another in diverse ways.

The invention is described in more detail hereinafter on the basis of exemplary embodiments.

DETAILED DESCRIPTION OF THE DRAWINGS

Figure 1:
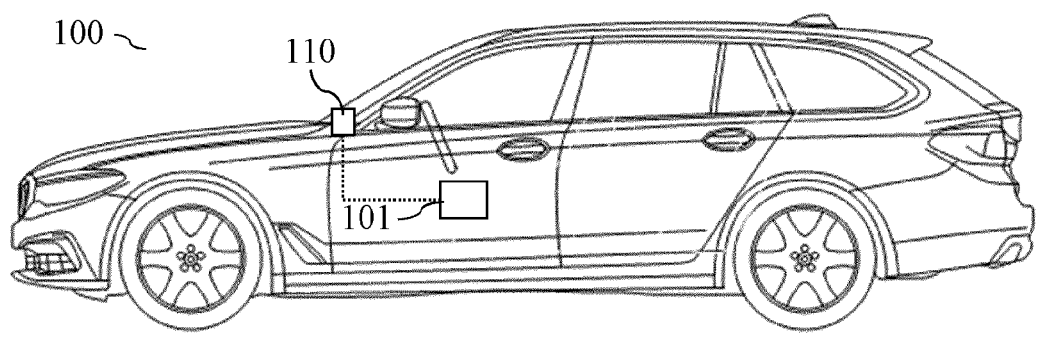
FIG. 1 shows exemplary components of a vehicle.

As described at the outset, the present document relates to providing a display unit having changing symbols for a (mechanical) operating element (which can possibly only be actuated in a single manner, so that only a single function can be triggered in each case at one point in time). In this context, FIG. 1 shows an exemplary (motor) vehicle 100, which comprises, for example, as part of a user interface, an operating element 110, which enables a user of the vehicle 100 to trigger different functions. The function which can be triggered using the operating element 110 can depend on the respective currently existing context. For example, the operating element 110 can be used, when the climate control system is active, to control a function of the climate control system or, when an infotainment system is active, to control the function of the infotainment system.

A control unit 101 of the vehicle 100 can be designed to ascertain the currently existing context. Furthermore, the control unit 101 can be configured to configure the operating element 110 in dependence on the currently existing context. It can be effectuated in particular here that a symbol is displayed on the operating surface of the operating element 110 which represents the function which can be triggered in the scope of the currently existing context via the operating element 110.

The operating element 110 can therefore include a display unit, which is designed to display in each case one symbol from a plurality of different symbols for the corresponding plurality of different functions in a selective manner at the operating surface of the operating element 110.

Figure 2A:
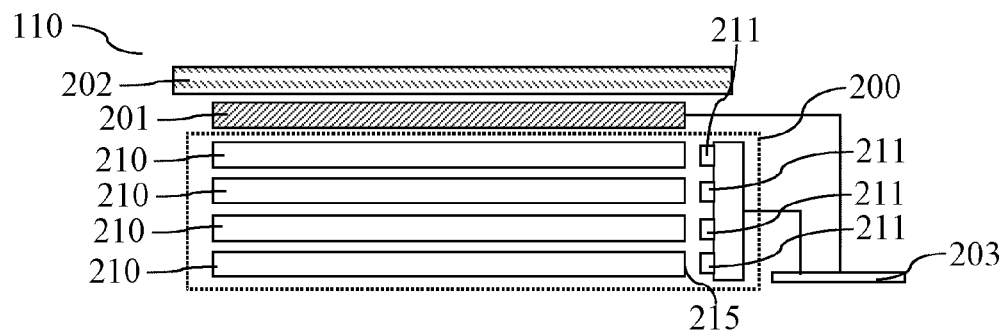
FIG. 2a shows an exemplary operating element in a side view.
Figure 2B:
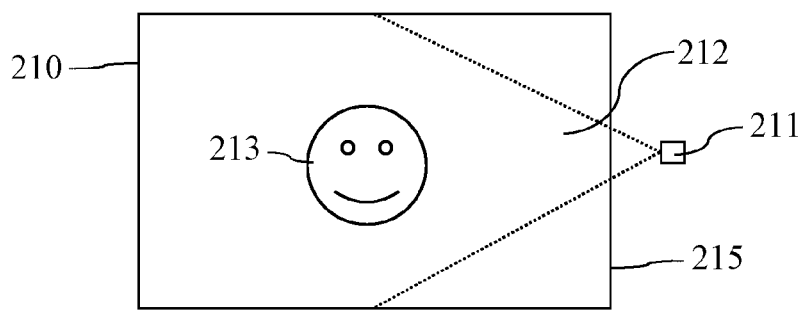
FIG. 2b shows an exemplary layer of an operating element in a front view.

FIGS. 2a and 2b show an operating element 110 having a display unit 200, wherein the display unit 200 includes a plurality of layers 210 having a corresponding plurality of different symbols 213. The individual layers 210 can each include a microstructure in the form of the respective symbol 213 to be displayed.

The display unit 200 furthermore comprises a plurality of light sources 211, in particular light-emitting diodes (LEDs), for the corresponding plurality of layers 210. The light source 211 for a layer 210 is configured to couple light 212 into the layer 210, wherein the light 212 is reflected and/or scattered at the microstructure for the symbol 213 of the layer 210, so that the symbol 213 becomes visible at the operating surface 202. The individual light sources 211 can be connected to a circuit board 203 of the display unit 200.

The operating element 110 furthermore comprises a transparent operating surface 202 (for example a cover lens made of transparent plastic). A touch-sensitive film 202 can be arranged below the operating surface 202, via which an actuation of the operating element 110, in particular a touch of the operating surface 202, can be detected.

The control unit 101 can be configured to ascertain in dependence on the currently existing context the function which can be triggered via the operating element 110. Furthermore, the layer 210 can be ascertained which includes the symbol 213 for this function. The light source 211 for the ascertained layer 210 can then be selected in a selective manner in order to display the symbol 213 associated with the function in a selective manner.

With increasing number of functions of an operating element 210, the number of layers 210 increases and therefore the required installation space of the display unit 200 perpendicular to the operating surface 202 increases. Furthermore, the differences with respect to the depth at which the different symbols 213 are perceived by a user at the operating surface 202 increases with increasing number of layers 210. Furthermore, each additional layer 210 results in additional shielding of the light 212 of the layers 210 lying underneath, so that the light intensity of the different symbols 213 is negatively affected.

Figure 3A:
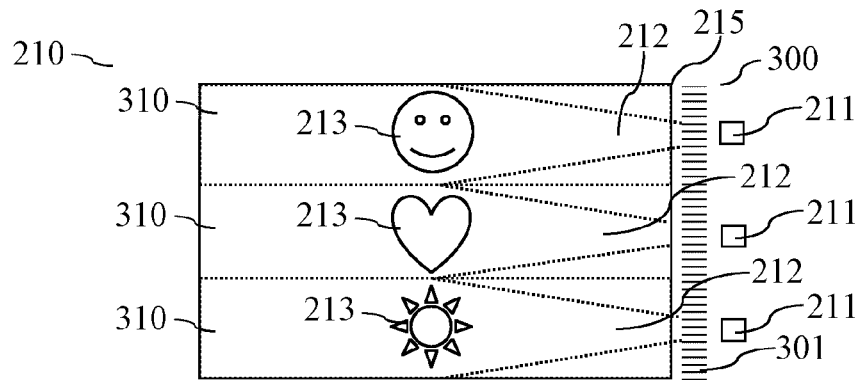
FIGS. 3a to 3c show different delimitation elements for selectively illuminating the individual symbols of a layer.
Figure 3B:
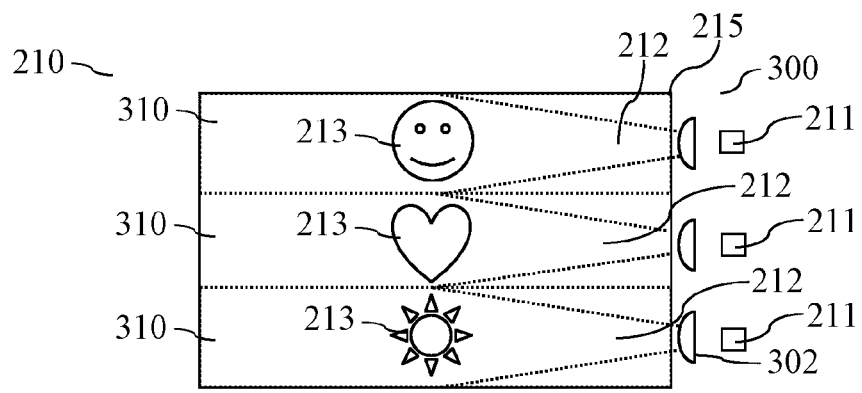
Figure 3C:
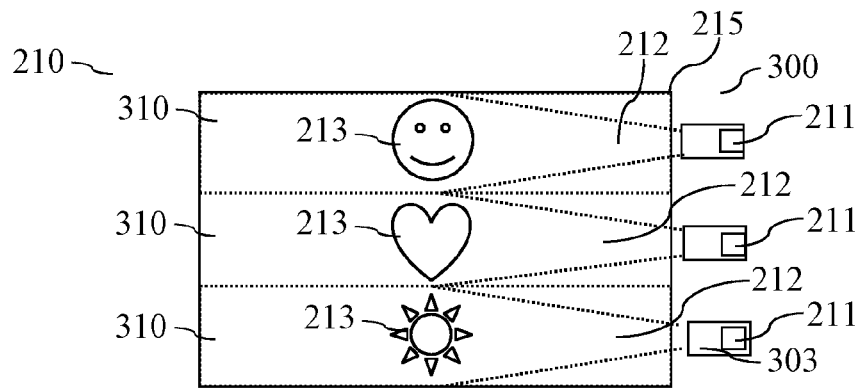

FIGS. 3a to 3c each show an exemplary layer 210 for a display unit 200. The respectively displayed layer 210 includes a plurality of subregions 310 for a corresponding plurality of different symbols 213. In this case this is a coherent layer 210, which includes different symbols 213 in different subregions 310.

Furthermore, the display unit 210 for the layer 210 shown in FIGS. 3a to 3c includes a plurality of light sources 211 for the corresponding plurality of subregions 310. The light source 211 for a subregion 310 can be designed to couple the light 212 into the subregion 310 in order to make the symbol 213 in this subregion 310 visible.

A light source 211 typically has a relatively broad emission range, which has the result that light 212 emitted by the light source 211 is radiated against the symbols 213 in multiple subregions 310 of a layer 210. The display unit 200 therefore includes a delimitation element 300, which is designed to delimit the light 212 emitted by the light source 211 for one subregion 310 to the symbol 213 of the subregion 310, so that only the symbol 213 of the subregion 310 is illuminated by the light source 211 and not the symbols 213 of the one or more other subregions 310 of the layer 210.

In the example shown in FIG. 3a, the delimitation element 300 includes a plurality of slats 301, which each extend perpendicularly away from the illuminated edge 215 of the layer 210 toward the light source 211. The delimitation element 300 shown in FIG. 3a uses the action principle of a reading protection film for a display screen in order to delimit the angle at which the light 212 of the individual light sources 211 is incident on the illuminated edge 215 of the layer 210. The individual slats 301 can have, for example, a web length (perpendicular to the illuminated edge 215 of the layer 210) of 50-300 µm. Furthermore, the individual slats 302 can have, for example, a spacing (along the illuminated edge 215 of the layer 210) between 50 µm and 100 µm.

A delimitation unit 300 having a plurality of slats 301 can therefore be arranged between the illuminated edge 215 of a subregion 310 of a layer 210, wherein the individual slats 301 extend perpendicularly to the illuminated edge 215, in order to delimit the emission angle of the light 212 emitted by the light source 211. A selective illumination of the different symbols 213 in the different subregions 310 of a layer 210 can thus be enabled in an efficient and reliable manner.

FIG. 3b shows a delimitation element 300, which includes a plurality of (converging) lenses 302 for the corresponding plurality of light sources 211 for illuminating the corresponding plurality of subregions 310. The individual lenses 302 are arranged adjacent to one another here along the illuminated edge 215 of the layer 210 having the plurality of subregions 310. The lens 302 for the light source 211 of one subregion 310 can be configured to bundle and/or focus the light 212 emitted by the light source 211 onto the respective subregion 310. A selective (i.e., mutually exclusive) illumination of the different symbols 213 on a layer 210 can thus be enabled in a reliable manner.

The delimitation element 300 shown in FIG. 3c includes a light channel 303 in each case for the individual light sources 211 of a layer 210, which is designed to bundle the light 212 emitted by the respective light source 211. A light channel 303 can be designed, for example, as a tube, which extends perpendicularly from the illuminated edge 215 of the layer 210 toward the respective light source 211. The light source 211 can be arranged here at the end of the light channel 303 facing away from the illuminated edge 215 of the layer 210. The light source 211 can possibly be enclosed by the light channel 303. The inner wall of a light channel 303 can possibly be made reflective, in order to effectuate particularly efficient and reliable bundling of the light 212 emitted by the light source 211.

Figure 4A:
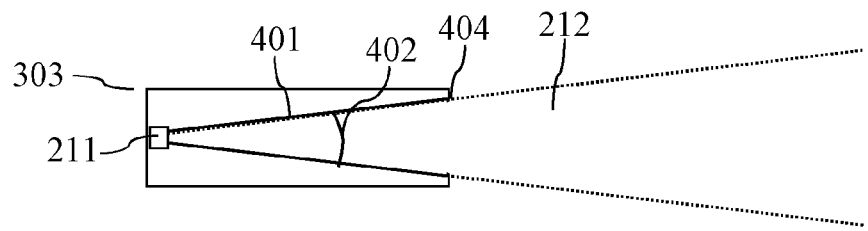
FIGS. 4a to 4d show different views of exemplary light channels.
Figure 4B:
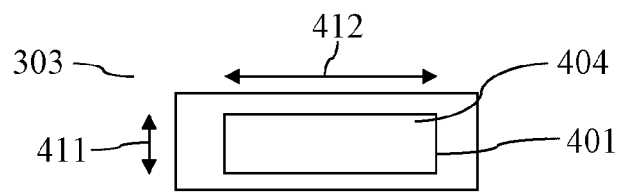
Figure 4C:
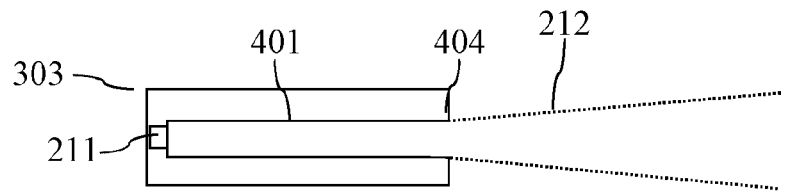
Figure 4D:
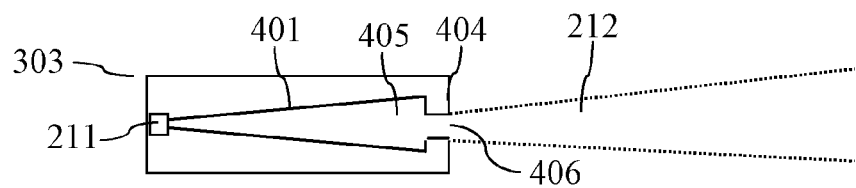

FIGS. 4a to 4d show different views and/or embodiments of a light channel 303. In particular, FIGS. 4a, 4c, and 4d show side views of different light channels 303 (along the propagation direction of the light 212, perpendicular to the illuminated edge 215 of the layer 210). FIG. 4b shows an exemplary outlet 404 of a light channel 303, which faces toward the illuminated edge 215 of the layer 210. The outlet 404 of the light channel 303 can have a defined width 412, which is dependent on the width 412 of the subregion 310 to be illuminated. Furthermore, the outlet 404 of the light channel 303 can have a defined height 411, which is dependent on the thickness of the layer 210 to be illuminated.

The inner wall 401 of the light channel 303 can widen, as shown by way of example in FIG. 4a, at a defined opening angle 402 originating from the light source 211 toward the outlet 404 of the light channel 303, in order to be able to set in a precise manner the emission angle of the light 212 at the outlet 404 of the light channel 303.

In the example shown in FIG. 4c, the inner wall 401 of the light channel 303 is designed such that the cross-section of the light channel 303 remains unchanged along the propagation of the light channel 303 from the light source 211 up to the outlet 404 of the light channel 303. Particularly effective bundling of the light 212 can thus be effectuated.

In the example shown in FIG. 4d, the light channel 303 forms a light chamber 405 having an opening 406 facing toward the illuminated layer 210. The light 212 emitted through the opening 406 can thus be bundled in a particularly reliable manner.

The measures described in this document enable a display unit 200 for an operating element 110 to be provided, using which different symbols 213 can be displayed in a selective manner within a single layer 210. The installation space of the operating element 110 can thus be reduced. Furthermore, an undesired depth effect can thus be avoided or at least reduced.

The present invention is not restricted to the exemplary embodiments shown. In particular, it is to be noted that the description and the figures are only to illustrate the principle of the proposed methods, devices, and systems by way of example.

The invention claimed is:

1. A display unit for an operating element, the display unit comprising:
    a layer divided into a plurality of subregions, which are arranged immediately adjacent to one another along an illuminated edge of the layer, wherein a corresponding plurality of symbols are arranged in the plurality of subregions;
    a plurality of light sources corresponding to the plurality of subregions, wherein the plurality of light sources are arranged adjacent to one another along the illuminated edge of the layer and are each configured to emit light into a respective subregion of the layer via the illuminated edge of the layer; and
    a delimitation element, which is arranged between the illuminated edge of the layer and the plurality of light sources, and which is configured to delimit the light emitted by the individual light sources for one subregion such that the symbol in the respective subregion is illuminated by the individual light sources in a selective manner.

2. The display unit according to claim 1, wherein:
    the delimitation element comprises a plurality of slats, which are arranged adjacent to one another along the illuminated edge of the layer; and
    the plurality of slats is designed to delimit a deviation of an angle, at which the light from a light source is incident on the illuminated edge of the layer, from a perpendicular standing on the illuminated edge to a predefined maximum value.

3. The display unit according to claim 1, wherein the maximum value is 30° or less.

4. The display unit according to claim 2, wherein:
    the individual slats each extend perpendicularly away from the illuminated edge of the layer toward the plurality of light sources;
    slats arranged directly adjacent to one another have a spacing between 50 µm and 100 µm with respect to one another; and
    the individual slats have a web length along the perpendicular standing on the illuminated edge between 100 µm and 300 µm.

5. The display unit according to claim 2, wherein the plurality of slats includes a subset of slats for each of the plurality of subregions, which subset of slats is arranged between the light source for the respective subregion and a section of the illuminated edge of the layer for the respective subregion.

6. The display unit according to claim 1, wherein:
    the delimitation element comprises a plurality of light channels for a corresponding plurality of light sources; and
    a light channel for a respective light source extends between the respective light source and a section of the illuminated edge of the layer, in which section the subregion of the layer illuminated by the respective light source is arranged.

7. The display unit according to claim 6, wherein:
the light channel for the respective light source includes an inner wall, which is configured to bundle the respective light emitted by the respective light source and guide the light emitted by the respective light source to the illuminated edge of the layer; and
the inner wall is configured to reflect light incident on the inner wall.

8. The display unit according to claim 6, wherein:
the light channel for the respective light source includes an outlet facing away from the respective light source, which outlet faces toward the illuminated edge of the layer;
the outlet of the light channel has a width, which is adapted to a width of the subregion which is illuminated by the respective light source; and
the outlet of the light channel has a height, which is adapted to a thickness of the layer.

9. The display unit according to claim 6, wherein:
the light channel for the respective light source has a cross-section having a cross-sectional area which increases originating from the respective light source toward the illuminated edge of the layer; or
the light channel for the respective light source has a cross-section having a cross-sectional area which remains unchanged in size from the respective light source up to the illuminated edge of the layer.

10. The display unit according to claim 6, wherein:
the light channel for the respective light source forms a chamber for the light emitted by the respective light source; and
the chamber includes an opening, which faces toward the illuminated edge of the layer and is punctiform, for light from the chamber.

11. The display unit according to claim 1, wherein the delimitation element is configured to delimit light emitted from an arbitrary first light source of the plurality of light sources for a first subregion of the plurality of subregions such that a symbol is illuminated in the first subregion by the first light source, without the symbols in any one of the other subregions of the plurality of subregions being illuminated at a same time.

12. The display unit according to claim 1, wherein at least one of:
the plurality of subregions comprises two or more subregions;
the layer is transparent; or
the symbol in the respective subregion of the layer includes a microstructure, at which the light is at least one of reflected or scattered in the respective subregion such that the symbol becomes visible on a surface of the layer.

13. The display unit according to claim 1, wherein at least one of:
the plurality of subregions comprises three or more subregions;
the layer is transparent; or
the symbol in the respective subregion of the layer includes a microstructure, at which the light is at least one of reflected or scattered in the respective subregion such that the symbol becomes visible on a surface of the layer.

14. An operating element, comprising:
a transparent operating surface, which is configured to be actuated by a user to trigger a function; and
the display unit according to claim 1;
wherein the layer of the display unit is covered by the transparent operating surface.

15. The operating element according to claim 14, wherein:
the operating element is configured to selectively trigger, depending on context, one function from a plurality of different functions in reaction to an actuation of the operating surface;
the plurality of different functions is associated with the plurality of symbols on the layer of the display unit; and
the operating element comprises a control unit, which is configured:
to ascertain a first function from the plurality of functions, which first function is triggerable via the operating element;
to ascertain a first light source by which the symbol associated with the first function is illuminated; and
to cause the first light source to emit light in order to illuminate the symbol associated with the first function.

* * * * *